July 30, 1968  A. B. GREENFIELD  3,394,921
BARRIER
Filed March 8, 1966  2 Sheets-Sheet 1
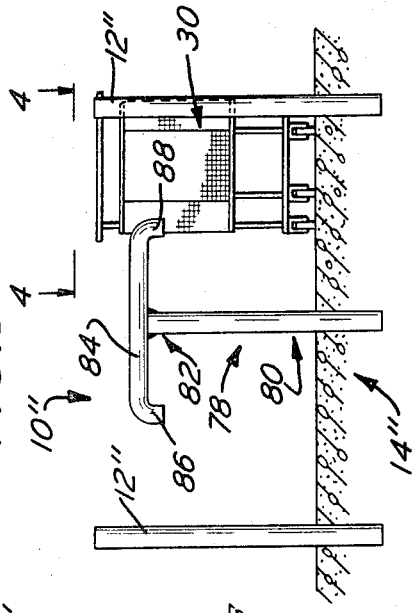
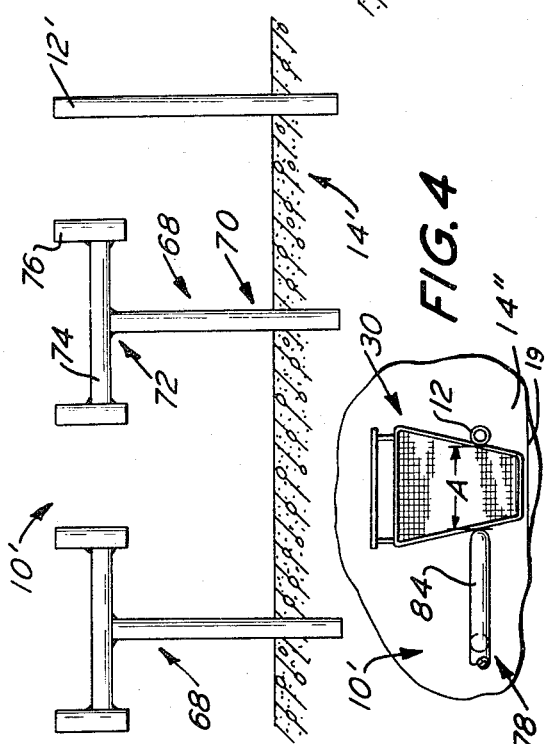
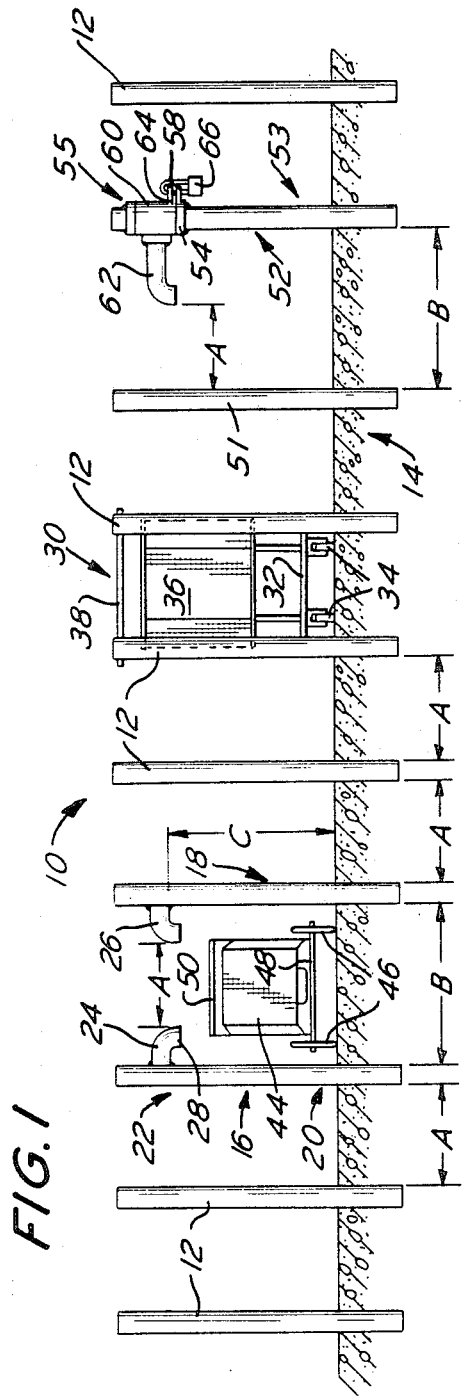
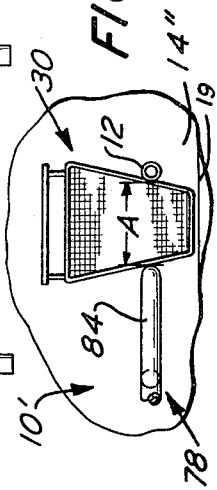
INVENTOR.
ALBERT B. GREENFIELD
BY
ATTORNEYS.

July 30, 1968  A. B. GREENFIELD  3,394,921
BARRIER
Filed March 8, 1966  2 Sheets-Sheet 2

INVENTOR
ALBERT B. GREENFIELD
BY
Serdal & Goroda
ATTORNEYS.

United States Patent Office 3,394,921
Patented July 30, 1968

3,394,921
BARRIER
Albert B. Greenfield, 1311 Huntingdon Pike,
Huntingdon Valley, Pa. 19006
Filed Mar. 8, 1966, Ser. No. 532,778
6 Claims. (Cl. 256—1)

ABSTRACT OF THE DISCLOSURE

A barrier to prevent removal of shopping carts or other articles of predetermined dimensions from the immediate premises of supermarkets or the like to adjacent areas, wherein the barrier includes spaced discrete post structures, the structures being spaced to permit passage of persons and hand-held two-wheeled shopping carts therebetween, but not the self-supported four-wheeled type carts supplied by the market.

---

This invention relates to a novel barrier. More particularly, this invention relates to a novel barrier which is adapted to prevent the removal of shopping carts or other wheeled vehicles from the premises of a self-service store.

Self-service stores such as supermarkets have found it difficult to maintain effective control over the shopping carts which are provided to hold the articles selected by a shopper until their cost can be tabulated and the purchase thereof can be completed. Consequently, substantial losses have occurred due to theft and damage to such carts.

It has been established that shopping cart loses can be substantially reduced if the carts can be retained upon the store premises. Patent 3,208,730 of the present inventor, which issued Sept. 28, 1965 and reissued as Re. 26,203, May 16, 1967, provided a novel means for retaining self-service shopping carts upon the immediate premises of the store in which they are used. The present invention is an improved barrier, which is equally effective for its intended purposes, and, as will appear hereinafter, is even more convenient for shoppers.

It should be noted that the shopping carts supplied by supermarkets are generally of the four-wheeled type, and therefore present relatively fixed predetermined vertical and horizontal dimensions. By comparison, shoppers often use two-wheeled, hand-supported carts, which are pivotable about their wheels, and therefore present a variable vertical dimension. Accordingly, it is a general object of this invention to provide a novel means whereby store supplied self-service carts are retained on the store premises, while persons and privately owned carts are permitted to pass freely therethrough.

The foregoing general object is accomplished by a barrier comprising a series of discrete upright post structures with adjacent solid portions of the structures so spaced that passage of self-supported shopping carts of the type provided by stores is precluded, the adjacent portions being spaced sufficiently, however, to permit passage of persons therebetween, and to permit the narrower portions of the self-supported carts to extend beyond the barrier. Also, at least some of the structures, although not sufficiently spaced to permit passage of the self-supported carts, are so dimensioned that two-wheeled hand-held carts may pass therebetween. Although disclosed in connection with self-supported shopping carts in particular, it should be understood that the principles of the present invention are applicable, if desired, to confinement by the barrier of any object of predetermined size and shape to a given area.

It is another object of this invention to provide a novel barrier for retaining shopping carts on the premises of a self-service store without interfering with the normal use of the store or the shopping carts.

It is still another object of this invention to provide a novel barrier which prevents the removal of shopping carts from the premises of the self-service store, but does not interfere with the normal ingress and egress of persons to and from the store.

It is still another object of this invention to provide a novel barrier which prevents the removal of store-owned shopping carts from the premises, but which can be modified to permit ingress and egress of such carts when necessary.

It is a further object of this invention to provide a novel barrier which prevents the removal of store-owned shopping carts from the premises of a self-service store, but permits persons drawing certain types of vehicles to pass directly therethrough.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a front elevation view of a portion of a barrier in accordance with the invention.

FIGURE 2 is a front elevation view of a portion of another embodiment of a barrier in accordance with the invention.

FIGURE 3 is a front elevation view of still another embodiment of the barrier in accordance with the invention.

FIGURE 4 is a partial plan view taken along the line 4—4 in FIGURE 3, and showing the manner in which the barrier of the present invention prevents the passage of store-owned shopping carts.

Figure 5:
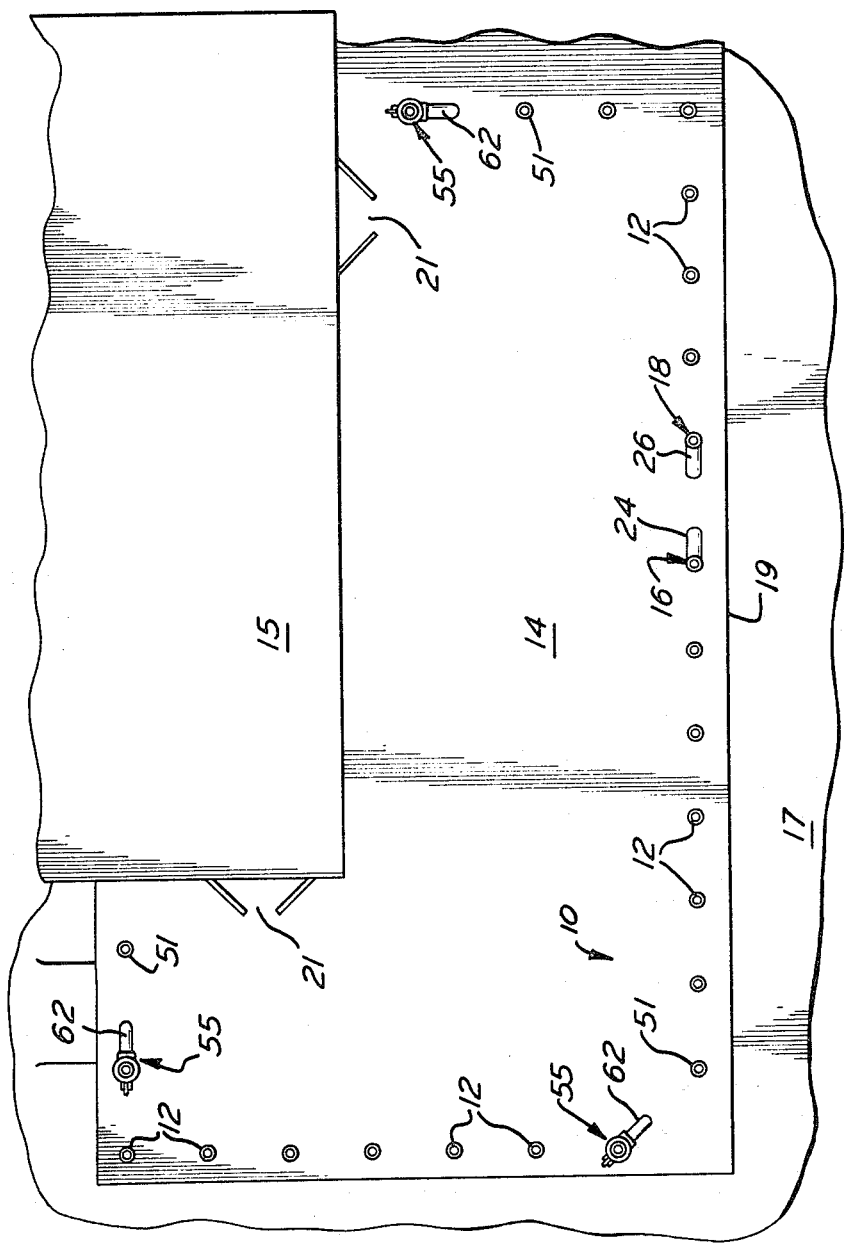
FIGURE 5 is a top plan view of a barrier in accordance with the present invention and the building structure and adjacent areas with which it is used.

Referring to the drawings in detail, wherein like numerals indicate like elements, there is shown in FIGURE 1 a barrier constructed in accordance with the present invention designated generally as 10. It should be understood that the barrier 10 is disposed with relation to a building, sidewalk, and parking lot or driveway in the manner set forth in Patent 3,208,730 and Re. 26,203. Thus, referring for the moment to FIGURE 5, the barrier 10 is disposed about a peripheral edge 19 of a "first area" or pedestrian walkway 14, the walkway being adjacent entranceways 21 of a building 15. A "second area" or driveway 17 adjoins the walkway 14.

As shown in FIGURE 1, the barrier 10 comprises a series of upright posts 12 mounted in a walkway 14. The posts 12 are uniformly spaced from each other. Posts 16 and 18, which include lower portions 20, spaced from each other a distance greater than the distance between the posts 12, are also mounted on the walkway 14. The lower portions 20 of the posts 16 and 18 are spaced from the posts 12 adjacent thereto by a distance approximating the spacing between respective posts 12. Upper portions 22 of the posts 16 and 18 include generally horizontally disposed members 24 and 26. The members 24 and 26 extend toward each other, and include distal free end portions. The distal free end portions may be provided with further downturned portions 28, thereby presenting a minimum number of potentially dangerous sharp edges to contact by persons passing therebetween.

The posts 12 are spaced from each other a distance slightly greater than the width at the hips of an adult person of about average size so as to permit the passage of walking persons therebetween. Such a distance is designated by the letter A in FIGURE 1. Also, the lower portions 20 of the posts 16 and 18 are spaced from their nearest adjacent posts 12, a distance slightly greater than such width. As is evident from FIGURE 1, the lower portions 20 of posts 16 and 18 are spaced from each other by a distance B, which is greater than the distance A. The free end portions of the members 24 and 26 also define between their respective distal end portions a distance equal to approximately the distance A.

As used hereinafter, the term "person" or "a person" should be understood to mean an adult of about average size.

In view of the above, it is believed that the manner in which the novel barrier of the present invention performs its desired function is obvious. Thus, there is seen in FIGURE 1 a store-supplied shopping cart designated generally by the reference numeral 30. Typically, such a cart includes a base 32 having a generally trapezoidal shape in plan view, and including a downwardly disposed wheel 34 at each corner thereof. Thus, the cart is wheel-supported, and self-balancing in the sense that it remains generally upright without outside support, as from the hand of the user. A basket 36 is supported in vertically spaced relation to the base 32, and has a similar shape in plan view. A handle 38 is secured to a rear portion of the basket to facilitate propulsion and guidance of the cart. It is to be understood that ideally, the distance A is somewhat greater than the width of the forward portion of the cart 30, but is in any case less than the width of the rear portion. Thus, the store-supplied shopping cart 30 cannot normally pass between any adjacent posts. In this regard, it should be noted that the generally horizontally disposed members 24 and 26 are spaced from the walkway 14 by a distance C, which is less than the height of the shopping cart 30. Thus, the shopping cart 30 is unable to pass thereunder. Also, the distance B is less than the height of the shopping cart 30, thereby precluding the possibility of removing the cart by placing it on its side.

There is seen between the posts 16 and 18 in FIGURE 1 a shopping cart 42 of the two-wheeled type, commonly used by shoppers. Such carts generally comprise a basket 44 supported by a pair of spaced wheels 46, which are secured to a single transverse axle 48. A handle 50 may be secured to an upper portion of the basket 44. Two-wheeled carts such as the shopping cart 42 are most often considerably narrower than store-supplied shopping carts 30, but are usually wider than the distance A. Accordingly, the distance B is wide enough for the shopping cart 42. Moreover, since they are held in an upright position by the hand of their user, such carts are easily pivoted about their axle 48 to pass below the members 24 and 26. Thus, it is apparent that a person may pass through the barrier between the posts 16 and 18, and draw his own shopping cart 42 with him.

Also seen in FIGURE 1 is a novel means whereby an opening may be provided in the barrier 10 to provide ingress or egress of shopping carts 36, or other large wheeled conveyances, such as baby carriages or wheel chairs. Accordingly, there is provided a pair of adjacent spaced posts 51 and 52, having lower and upper portions 53 and 55, respectively. The lower portion 53 of post 51 is spaced from the adjacent post 12 by a distance approximating the distance A. The lower portion of the post 52 is spaced from the adjacent post 12 by a similar distance. The respective lower portions 53 of the posts 51 and 52 are spaced apart by a distance approximating the distance B. The upper portions 55 of the post 52 include a pair of vertically spaced peripheral collars 54 and 56. The collar 54 includes an eye 58, the purpose of which will shortly be apparent. The upper portion of the post 52 also includes a tubular portion 60, disposed between the collars 54 and 56, and a generally horizontally disposed member 62 secured to the tubular portion 60. The member 62 includes a distal free end portion. An eye 64 is fixedly secured to the tubular portion 60. As is evident from the figure, the eyes 58 and 64 are in vertical alignment when the generally horizontally disposed member 62 extends toward post 51. Thus, a lock 66, which may be of any conventional type, may be passed through the eyes 58 and 64, thereby locking the member 62 in its illustrated position. Alternatively, the lock 66 may be removed, and the tubular portion 60 rotated about the post 52, thereby providing an unobstructed opening between the posts 51 and 52. It should be understood that when the member 62 is in the illustrated position, the distal free end portion of the member 62 and the post 51 define therebetween a distance approximating the distance A.

Referring now to FIGURE 2, there is seen an alternative barrier construction designated generally by the numeral 10', and wherein elements corresponding to those of the barrier previously described are designated by like primed numerals.

The barrier 10' comprises a series of spaced upright posts 12' mounted in a walkway 14'. Also, at spaced intervals, the barrier 10' includes posts 68, having lower portions 70 and upper portions 72. The upper portions 72 of the post 68 include a generally horizontally disposed member 74, which extends outwardly in opposite directions. Vertically extending portions 76 are secured to opposite ends of the horizontally disposed member 74, and define respective distal free end portions thereof. The vertically extending portions 72 of adjacent posts 68 are spaced apart by a distance approximately the distance A, and therefore permit passage of walking persons therebetween. Also, the horizontally disposed members 74 are spaced above the walkway 14' by a distance approximately the distance C. Accordingly, the store-supplied shopping carts are effectively retained. Moreover, the lower portions 70 of adjacent posts 68 are ideally so spaced that store-supplied shopping carts cannot be passed therebetween, even if placed on their sides. It should be understood that the distance between the lower portion 70 and the adjacent post 12' also approximates the distance A, and accordingly, prevents passage of store-supplied shopping carts. Those skilled in the art will appreciate that a serviceable barrier may be constructed using a series of posts 68, with posts 12' only at the respective corners thereof. It has been found, however, that such a barrier is considerably more expensive to construct than one having posts 68 only at selected intervals. Nevertheless, a barrier of the former type should be considered to be within the scope of the present invention.

Referring to FIGURE 3, there is seen still another alternative barrier construction designated generally by the numeral 10", and wherein elements corresponding to those of the barrier previously described are designated by like double-primed numerals. The barrier 10" comprises a series of upright posts 12" mounted in the walkway 14". The posts 12" are generally uniformly spaced from each other. In addition, the barrier 10" includes posts 78, having lower portions 80 and upper portions 82. The upper portions 82 include a generally horizontally disposed member 84, a medial portion of which is secured to an upright portion of the post 78. The horizontally disposed member 84 has at opposite ends thereof distal free end portions, which include downturned portions 86 and 88. The downturned portions 86 and 88 serve a purpose similar to that of the downturned portion 28 of the barrier 10. It should now be evident that the distal free ends of the horizontally disposed member 84 are spaced from adjacent posts 12" by a distance approximating the distance A. It should also be evident that the member 84 is spaced from the walkway 14" by a distance approximating the distance C. Moreover, it should be apparent that the lower portions 80 of the posts 78 are ideally spaced from the adjacent posts 12" by a distance approximating the distance B, thereby preventing passage of a shopping cart 30, even if placed on its side.

Referring now to FIGURE 4, there is seen a plan view of the barrier 10″, illustrating the manner in which the barriers of the present invention bar passage of a store-supplied shopping cart 30. Thus, it is seen that the smaller base of the generally trapezoidal cart 30, which is smaller than the distance A, passes between the distal free end portion of the horizontally disposed member 84 and the adjacent post 12″. Note, however, that the larger base, at the rear of the cart, is considerably larger than the distance A, and thereby precludes passage. Nevertheless, as is evident from the figure, at least a portion of the cart protrudes beyond the barrier 10′, toward the edge 19 of the walkway 14″. It will be recognized, then, that automobiles may be driven closely adjacent the edge 19 of the walkway 14″, and purchases transferred directly from the protruding front portion of the cart 30 to the automobile. It should be understood that a similar relation between the cart, the barrier and the walkway is characteristic of any of the embodiments described herein.

A proper understanding of the present invention requires a discussion of the dimensions heretofore denoted A, B and C. As is obvious from the foregoing, the dimensions are derived from a weighing of three important factors: the overall dimensions of the average store-supplied shopping cart, the width of the average privately-owned shopping cart, and the width of at least a great majority of persons. Thus, an unobvious aspect of the present invention is the dimensioning of the various structural elements to accommodate passage of certain objects, but not others. In particular, the dimension A is usually on the order of 17 to 19 inches, which is sufficient to permit passage of all but the most obese persons, but not wide enough for passage of present-day store-supplied shopping carts. The dimension B, under present-day practice, would be in the range of 29 to 31 inches, which is considerably wider than the usual shopping cart 42, but insufficient to permit passage of shopping carts 30 if placed on their sides. The dimension C is dictated primarily by the overall height of the shopping carts 30, and in present practice, is ideally in the range of 29 to 31 inches. Thus, shopping carts 30, when on their wheels, will not pass below the horizontally disposed parts of the respective upper portions. It has been found that an overall height of approximately 38 inches is most suitable for the various posts. Thus, a barrier of such height is not so imposing as to discourage approach, yet is effective for its intended purpose.

It should be understood that the dimensions dictated by the size of the store-supplied shopping carts may be defined in relation to the size of such carts, rather than by absolute measurements. Thus, the proportions of the barrier of the present invention may be modified should the size of the conventional store-supplied cart change at some future date.

Thus, it may be seen that the barrier of the present invention provides, by unobvious structural relationships, a clear advance in the art, since it may be used in a manner of which prior art barriers are incapable. Moreover, the present barrier is considerably less expensive to construct, and more effective for its intended purpose than prior art barriers.

Hereinafter, the term "post structure" may be used generically to designate the above-described posts of various configurations, and the term "building" used generically to designate the store or the like on whose premises shopping carts are to be retained.

Also, the above-described store-supplied shopping carts and other objects retained by the barrier 10 may be referred to for the purpose of definition as "objects of first predetermined size and shape" and objects such as hand-held carts, capable of passing through the barrier, referred to as "objects of second predetermined size."

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a first area adjacent a building, a second area adjoining said first area, an object of a first predetermined size and shape in said first area, and barrier means arranged around a portion of the perimeter of said first area for controlling movement of said object of first predetermined size and shape from said first to said second area, said barrier comprising generally vertically disposed discrete post structures having lower and upper portions, adjacent post structures having their respective upper portions spaced apart by a distance of about the body width at the hips of adult persons of average size so as to define a passage for persons therebetween, and having their respective lower portions spaced apart by a distance greater than the distance between their upper portions to facilitate passage of objects of a second predetermined size therebetween, the respective upper portions of said adjacent post structures being spaced from the level of said first area by a first portion thereof having a distance less than the height of said object of first predetermined size and shape, and said object of first predetermined size and shape having a horizontal dimension smaller than the width of said passage and a second portion thereof having a horizontal dimension greater than the width of said passage so that said first portion thereof can extend through said barrier toward said second area while said object is retained in said first area.

2. Apparatus in accordance with claim 1 wherein said object of first predetermined size and shape is a self-balancing shopping cart, the plan shape of said shopping cart being a trapezoid, the smaller base of said trapezoid defining said horizontal dimension smaller than the width of said passage and the larger base of said trapezoid being wider than said passage.

3. Apparatus in accordance with claim 1 wherein the upper portion of at least one of said post structures comprises a generally horizontally disposed member having a medial portion thereof coupled to the lower portion of said post structure, said horizontally disposed member extending toward the adjacent structures on opposite sides of said one post structure and having distal free end portions defining the passage between the adjacent post structures.

4. Apparatus in accordance with claim 1 wherein said upper portion of at least one of said post structures comprises a generally horizontally disposed member extending toward the adjacent post structure and having a distal free end portion defining the passage between the adjacent post structures.

5. Apparatus in accordance with claim 4 wherein said member is pivotably secured to a portion of said post structure for movement between a first position extending toward the adjacent post structure and a second position wherein the width of the passage between the upper portions of the adjacent post structures is increased to facilitate passage of said object of first predetermined size and shape therebetween, and locking means for securing said member in the first position.

6. Apparatus comprising a first area adjacent a building, a second area adjoining said first area, an object of first predetermined size and shape in said first area, and barrier means arranged around a portion of the perimeter of said first area for controlling movement of said object from said first to said second area, said barrier comprising a series of generally vertically disposed post structures having lower and upper portions, first adjacent posts having their respective lower and upper portions spaced apart by a distance of about the body width at the hips of adult persons of average size so as to define a passage for persons therebetween, second adjacent post structures having their respective lower portions spaced apart by a distance greater than the distance between the respective lower and upper portions of said first adjacent post structures to facilitate passage of objects of second predetermined size therebetween, the respective upper portions of said second adjacent post structures being spaced apart by a distance about equal to the width of said passage, the respective upper portions of said second adjacent post structures being spaced from the level of said first area by a distance less than the height of said object of first predetermined size and shape, and said object of first predetermined size and shape having a first portion thereof having a horizontal dimension smaller than the width of said passage and a second portion thereof having a horizontal dimension greater than the width of said passage so that said first portion thereof can extend through said barrier to a point proximate said second area while said object is retained in said first area.

References Cited

UNITED STATES PATENTS

| | | | |
|---|---|---|---|
| 267,523 | 11/1882 | Harris | 256—19 |
| 486,541 | 11/1892 | Barrett | 256—1 |
| 791,713 | 6/1905 | McCarthy. | |
| 931,724 | 8/1909 | Birney | 49—49 X |
| 947,929 | 2/1910 | Nelson. | |
| 1,457,900 | 6/1923 | Fairbairn | 256—64 |
| 2,015,607 | 9/1935 | Shinn | 49—266 X |
| 2,799,480 | 7/1957 | Mead | 256—19 |
| 3,208,730 | 9/1965 | Greenfield | 256—1 X |

FOREIGN PATENTS 310,095   7/1933   Italy.

DAVID J. WILLIAMOWSKY, *Primary Examiner.*

DENNIS L. TAYLOR, *Assistant Examiner.*